United States Patent
Elhadad et al.

(10) Patent No.: US 12,284,495 B2
(45) Date of Patent: *Apr. 22, 2025

(54) METHOD AND SYSTEM FOR REDUCING AUDIBLE EFFECTS OF ULTRASONIC STIMULATION

(71) Applicant: Emerge Now Inc., Marina del Rey, CA (US)

(72) Inventors: Adam Elhadad, Marina del Rey, CA (US); Naveen Anand Gunalan, Marina del Rey, CA (US); Ravi Patel, Marina del Rey, CA (US); James D. Hamilton, Marina del Rey, CA (US)

(73) Assignee: Emerge Now Inc., Marina del Rey, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/416,824

(22) Filed: Jan. 18, 2024

(65) Prior Publication Data

US 2024/0163606 A1 May 16, 2024

Related U.S. Application Data

(63) Continuation of application No. 18/223,948, filed on Jul. 19, 2023, now Pat. No. 11,917,380.

(60) Provisional application No. 63/390,374, filed on Jul. 19, 2022.

(51) Int. Cl.
*H04R 3/02* (2006.01)
*G06F 3/01* (2006.01)

(52) U.S. Cl.
CPC .............. *H04R 3/02* (2013.01); *G06F 3/016* (2013.01)

(58) Field of Classification Search
CPC .. F16C 19/381; F16C 2361/61; F16C 19/305; F16C 19/362; F16C 33/581; F16H 25/06; F16H 49/001
USPC ....................................................... 381/71.1
See application file for complete search history.

(56) References Cited

U.S. PATENT DOCUMENTS

| | | | |
|---|---|---|---|
| 11,054,910 B1 * | 7/2021 | Brummel | G06F 3/013 |
| 2018/0352338 A1 | 12/2018 | Murarka et al. | |
| 2018/0367921 A1 | 12/2018 | Murarka et al. | |
| 2021/0389825 A1 * | 12/2021 | Hamilton | G06T 17/20 |
| 2023/0020835 A1 * | 1/2023 | Gunalan | G06T 17/20 |

* cited by examiner

*Primary Examiner* — Carolyn R Edwards
*Assistant Examiner* — Friedrich Fahnert
(74) *Attorney, Agent, or Firm* — Jeffrey Schox; Diana Lin

(57) ABSTRACT

A system for reducing unwanted audible effects can include any or all of: a tactile stimulation device; a set of audio input devices; a set of filters and/or barriers; a set of audio output devices; a computing and/or processing subsystem; a set of algorithms and/or models; an extended reality subsystem; and/or any other components. A method for reducing unwanted audible effects includes any or all of: collecting information from each user of a set of users at a set of audio input devices; processing the audio information; and transmitting the processed audio information to any or all of the set of users.

18 Claims, 16 Drawing Sheets

METHOD AND SYSTEM FOR REDUCING AUDIBLE EFFECTS OF ULTRASONIC STIMULATION

CROSS-REFERENCE TO RELATED APPLICATIONS

This application is a continuation of U.S. application Ser. No. 18/223,948, filed 19 Jul. 2023, which claims the benefit of U.S. Provisional Application No. 63/390,374, filed 19 Jul. 2022, which is incorporated in its entirety by this reference.

TECHNICAL FIELD

This invention relates generally to the immersive experience field, and more specifically to a new and useful system and method for reducing audible effects of ultrasonic stimulation in the immersive experience field.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. Overview

Figure 1:
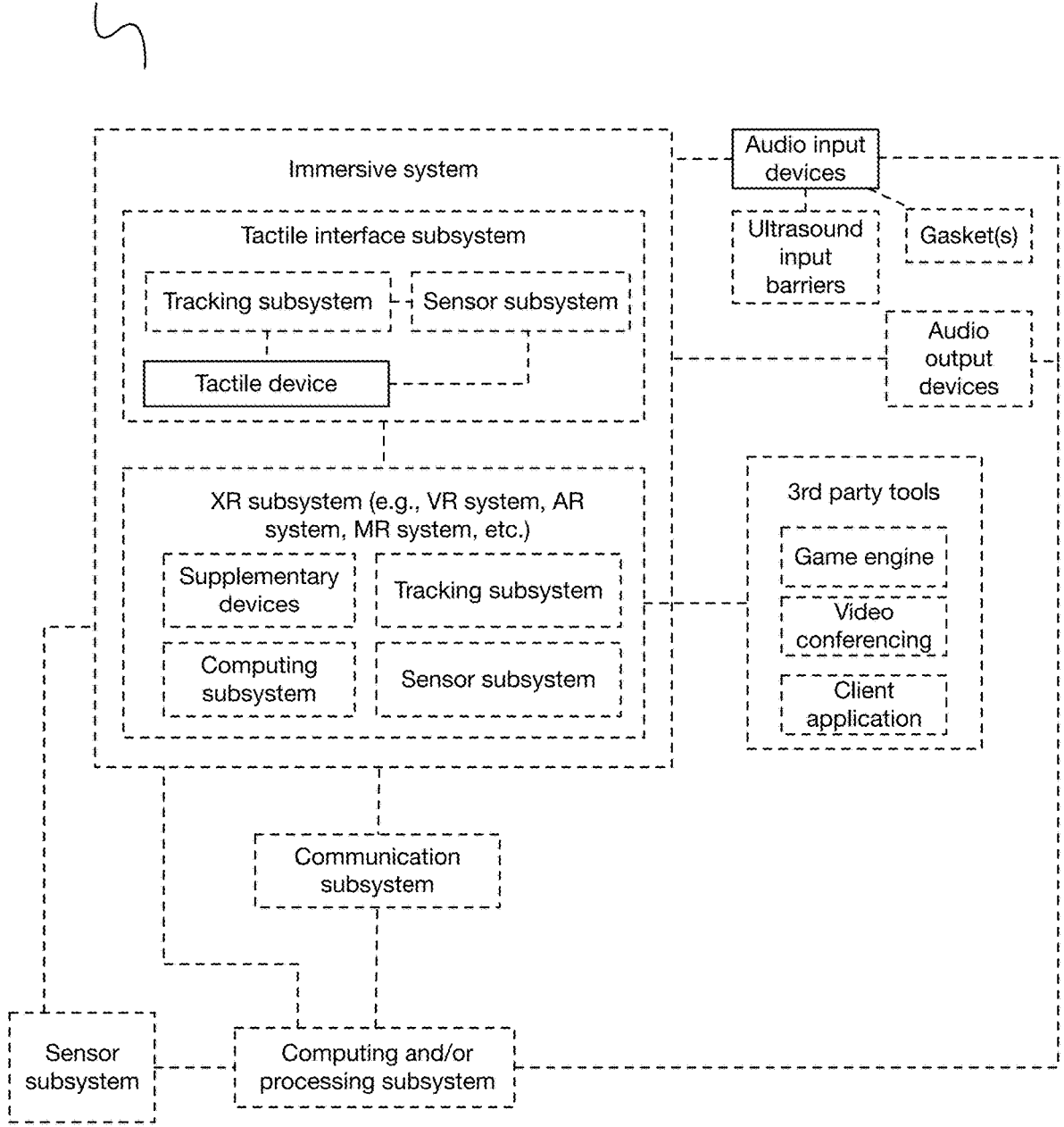
FIG. 1 is a schematic of a system for reducing audible effects of ultrasonic stimulation.

As shown in FIG. 1, a system 100 for reducing unwanted audible effects can optionally include any or all of: a tactile stimulation device; a set of audio input devices; a set of filters and/or barriers (e.g., ultrasound input barriers, audio input barriers, etc.); a set of audio output devices; a computing and/or processing subsystem; a set of algorithms and/or models; an extended reality subsystem; and/or any other components. Additionally or alternatively, the system can include and/or interface with any or all of the components as described in any or all of: U.S. application Ser. No. 15/662,159, filed 27 Jul. 2017; U.S. application Ser. No. 17/296,445, filed 11 Mar. 2019; U.S. application Ser. No. 17/189,828, filed 2 Mar. 2021; U.S. application Ser. No. 17/346,912, filed 14 Jun. 2021; and U.S. Ser. No. 17/943,418, filed 13 Sep. 2022; each of which is incorporated in its entirety by this reference.

Figure 2:
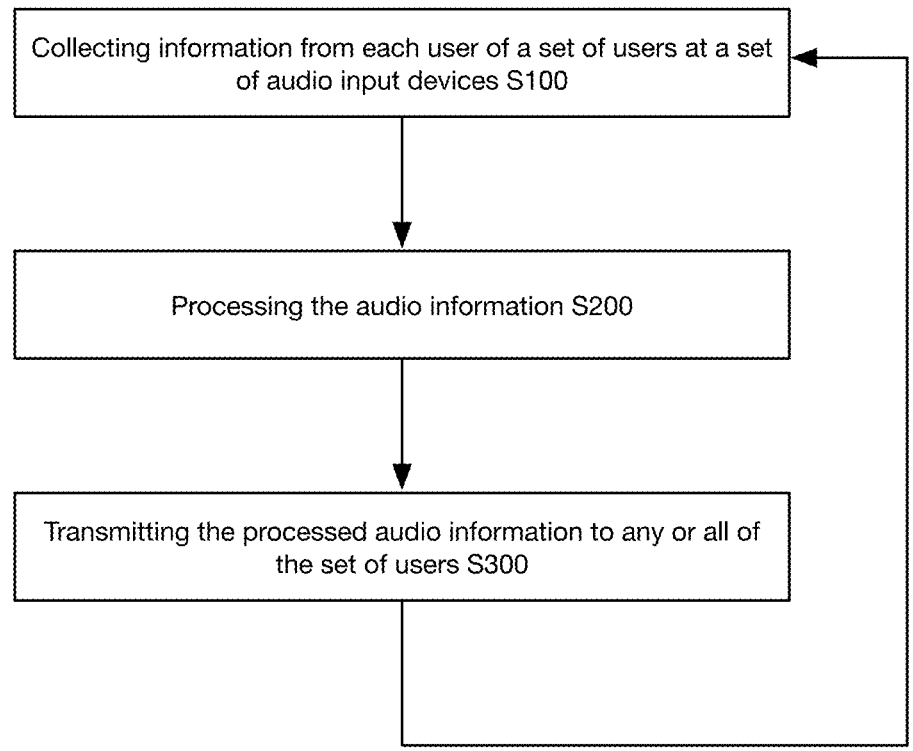
FIG. 2 is a schematic of a method for reducing audible effects of ultrasonic stimulation.

As shown in FIG. 2, a method 200 for reducing unwanted audible effects includes any or all of: collecting information from each user of a set of users at a set of audio input devices S100; processing the audio information S200; and transmitting the processed audio information to any or all of the set of users S300. Additionally or alternatively, the method 200 can include and/or interface with any or all of the processes as described in any or all of: U.S. application Ser. No. 15/662,159, filed 27 Jul. 2017; U.S. application Ser. No. 17/296,445, filed 11 Mar. 2019; U.S. application Ser. No. 17/189,828, filed 2 Mar. 2021; U.S. application Ser. No. 17/346,912, filed 14 Jun. 2021; and U.S. application Ser. No. 17/943,418, filed 13 Sep. 2022; each of which is incorporated in its entirety by this reference, or any other suitable processes performed in any suitable order. The method 200 can be performed with a system 100 as described above and/or any other suitable system.

In preferred implementations, the system 100 and/or method 200 are at least partially configured to enable communication between multiple users (e.g., arranged remotely relative to each other), which can involve, for instance, any or all of: remote tactile interaction (e.g., with tactile sensation representing their hands, with tactile sensation representing objects they can both interaction with, with tactile sensation otherwise enhancing their communication, etc.), remote communication of audio (e.g., through microphones and speakers), remote viewing of shared visual content (e.g., at a set of displays associated with each other), remote listening of shared audio (e.g., music), and/or any other shared experiences.

Additionally or alternatively, the system 100 and/or method 200 can be configured for individual use (e.g., gaming, communication with a robot, viewing of content, etc.), and/or any other purposes or combination of purposes.

2. Benefits

The system and method for reducing unwanted audible effects can confer several benefits over current systems and methods.

In a first variant, the technology confers the benefit of reducing and/or eliminating a set of audible effects, such as, but not limited to: reducing audible effects resulting from aliasing of ultrasound waves; reducing audible effects resulting from the rapid change in phase of ultrasonic transducers and/or resonance effects of the transducers; reducing audible effects from feedback of microphones and speakers in close proximity; minimizing and/or eliminating unwanted noise (e.g., non-speech audio); any combination of audible effects; and/or any other audible effects. The audible effects can be reduced and/or eliminated from any or all of: being conveyed to a user associated with the tactile stimulation device that produced any or all of the audible effects; being conveyed to another user remote from the tactile stimulation device that produced any or all of the audible effects; and/or audible effects affecting any or all users can be eliminated and/or reduced.

Figure 8:
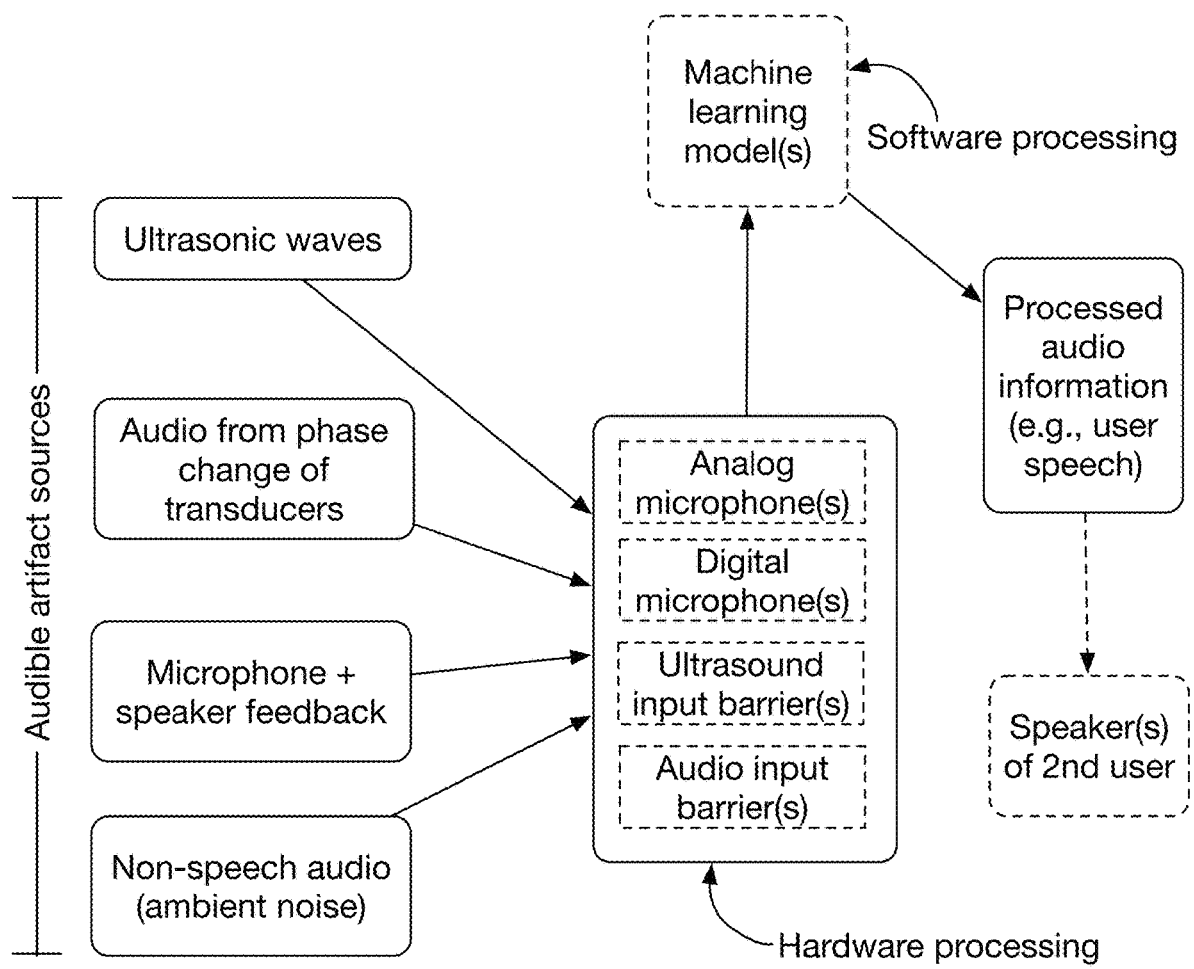
FIG. 8 depicts a variant of potential audible artifact sources and their mitigation through hardware and software solutions.

In a second variant, additional or alternative to the first, the technology confers the benefit of providing a pleasant user experience to users interacting with mid-air ultrasonic tactile stimulation by preventing unnecessary and/or annoying (e.g., high-pitched, loud, noticeable, etc.) audio—any or all of which is necessarily created in response to creating the ultrasonic stimulation—from being heard by the user and/or propagated to other users. In specific examples, this is enabled through a dual hardware-software solution (e.g., as shown in FIG. 8) including a set of signals processing algorithms and hardware components.

Additionally or alternatively, the system and method can confer any other benefit.

3.1 System—Tactile Stimulation Device

Figure 3:
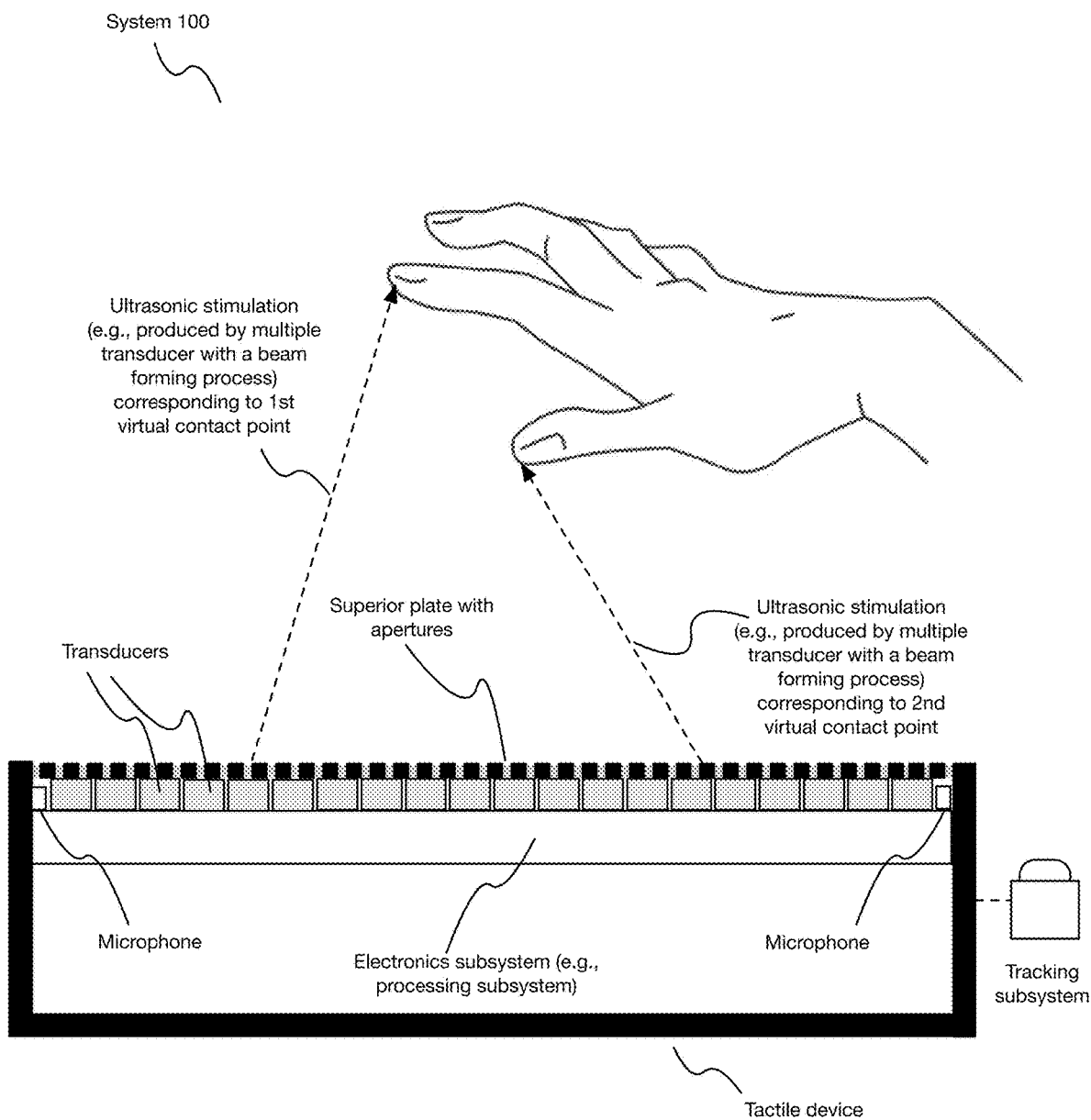
FIG. 3 depicts a variation of a system for reducing audible effects of ultrasonic stimulation.

The system 100 preferably includes and/or interfaces with a tactile stimulation device (equivalently referred to herein as a tactile device and/or tactile interface subsystem) (e.g., as shown in FIG. 3), which functions to produce tactile sensation(s) perceivable by a user based on tactile data and/or commands, such as those produced contemporaneously with (e.g., during, in parallel with, etc.) the method 200. The tactile stimulation device preferably includes a set of transducer devices, where the tactile stimulation device produces the tactile sensation through the set of transducer devices, preferably ultrasound transducer devices. In preferred variations, the tactile stimulation device produces ultrasonic tactile sensation (acoustic radiation pressure) through a set of ultrasound transducer devices. The ultrasound transducers preferably include one or more microelectromechanical [MEMS] speaker devices configured to emit acoustic waves in at least an ultrasonic frequency range (e.g., 40 kHz, between 30 and 50 kHz, between 20 and 60 kHz, between 35 and 55 kHz, greater than 30 kHz, etc.), but can additionally or alternatively include any other suitable ultrasound devices, such as those producing ultrasonic sensation through an oscillating body, piezoelectric device, and resonator (e.g., funneled resonator to radiate ultrasonic energy to the air). The tactile stimulation device preferably includes multiple transducers (e.g., greater than 100, greater than 50, between 300 and 500, between 200 and 600, etc.), such as an array of hundreds of transducers. Additionally or alternatively, the tactile stimulation device can include any number of transducers.

The tactile interface system preferably defines a tactile interaction volume, which refers to a volume of space (e.g., a volume of air) proximal to (e.g., adjacent to) the tactile interface device in which a user can receive/perceive tactile sensation from the tactile device. In preferred variations including a tabletop tactile interface device, the tactile interaction volume is above a superior broad surface of the tactile interface device, wherein the ultrasound transducer devices are arranged in a phased array parallel to the superior broad surface. Additionally or alternatively, any other tactile interaction volumes can be created.

In additional or alternative variations, tactile sensation can be produced through any other forms or combinations of tactile stimulation, ultrasonic or non-ultrasonic.

In specific examples, ultrasonic tactile sensation is produced at mid-air localized points perceivable by a user with phased array beamforming (e.g., through a set of beamforming algorithms implemented at a processing system associated with the tactile device), which enables virtual objects to be accurately and perceivably produced with high tactile resolution.

Figure 9A:
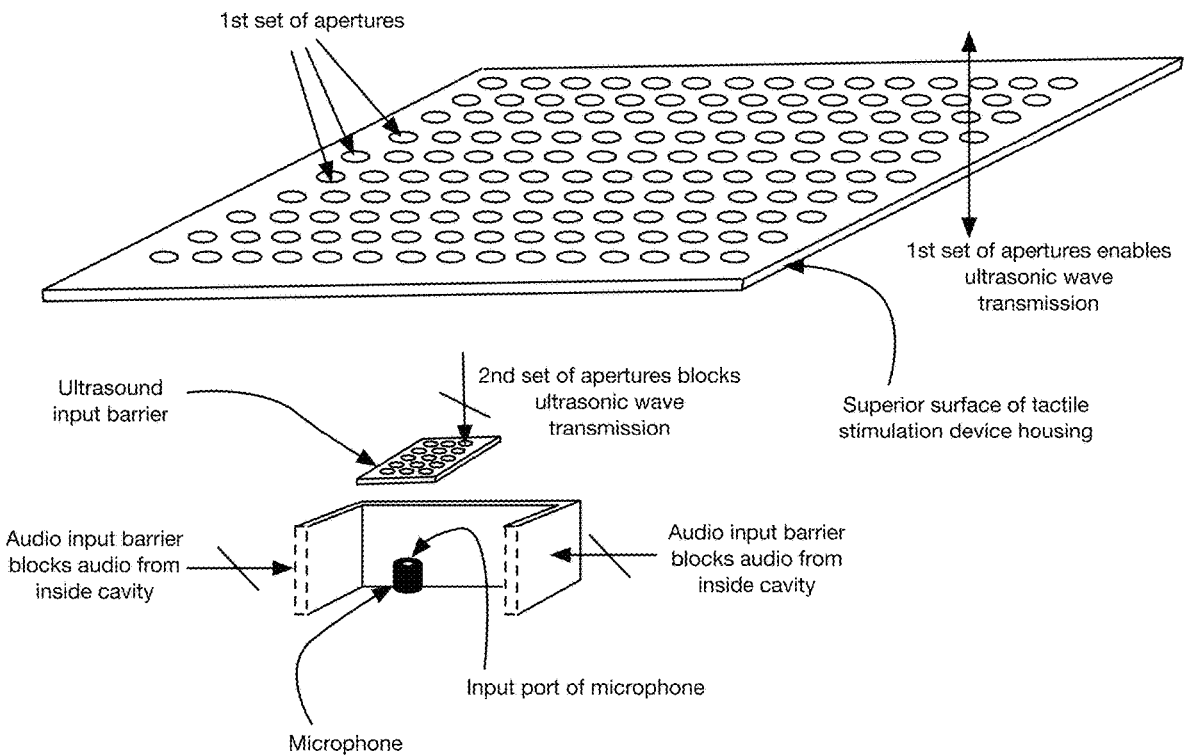
FIGS. 9A-9B depict a variant of an tactile stimulation device implementing an ultrasound input barrier.
Figure 9B:
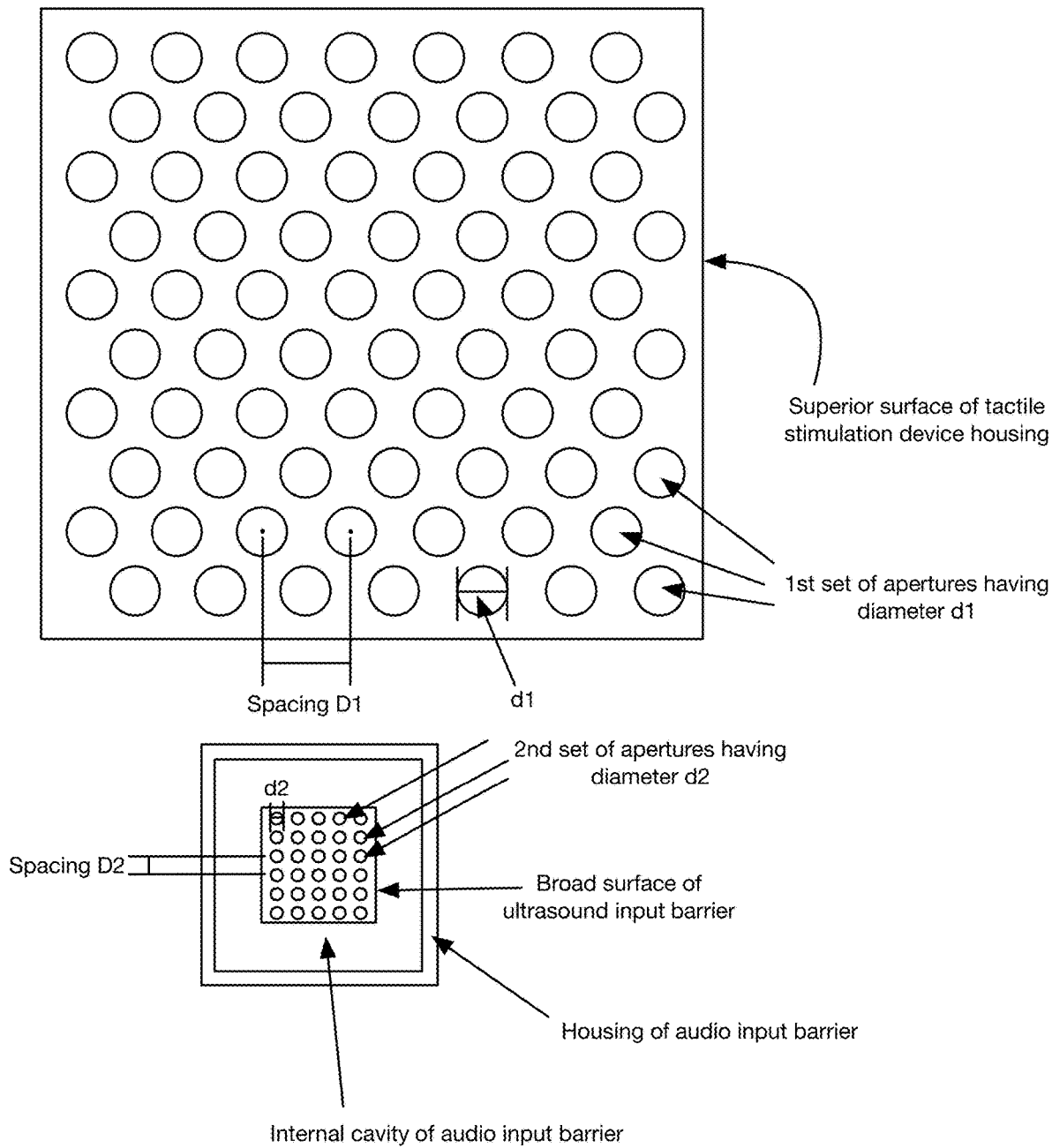
Figure 10A:
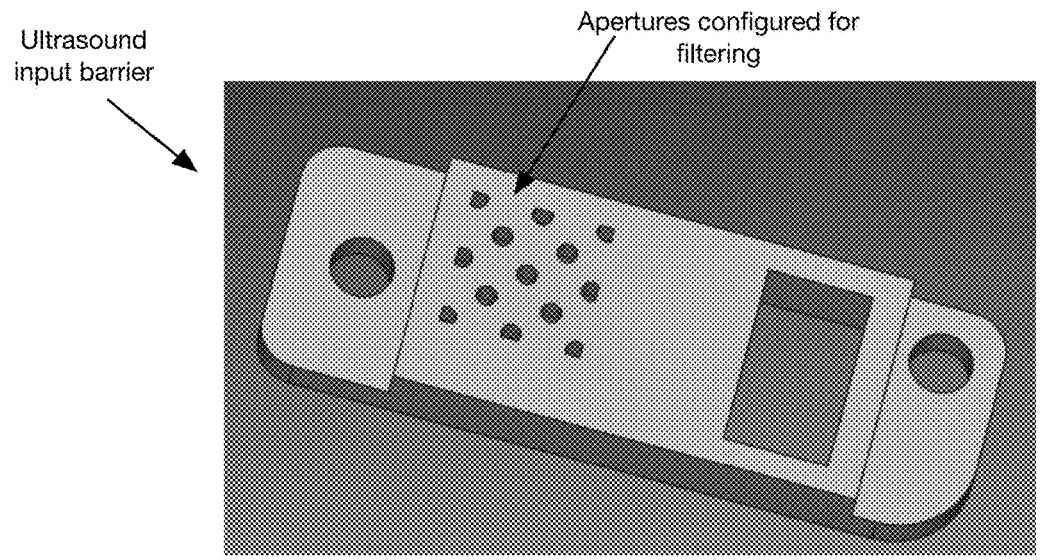
FIGS. 10A-10D depict an example of an ultrasound input barrier.
Figure 10B:
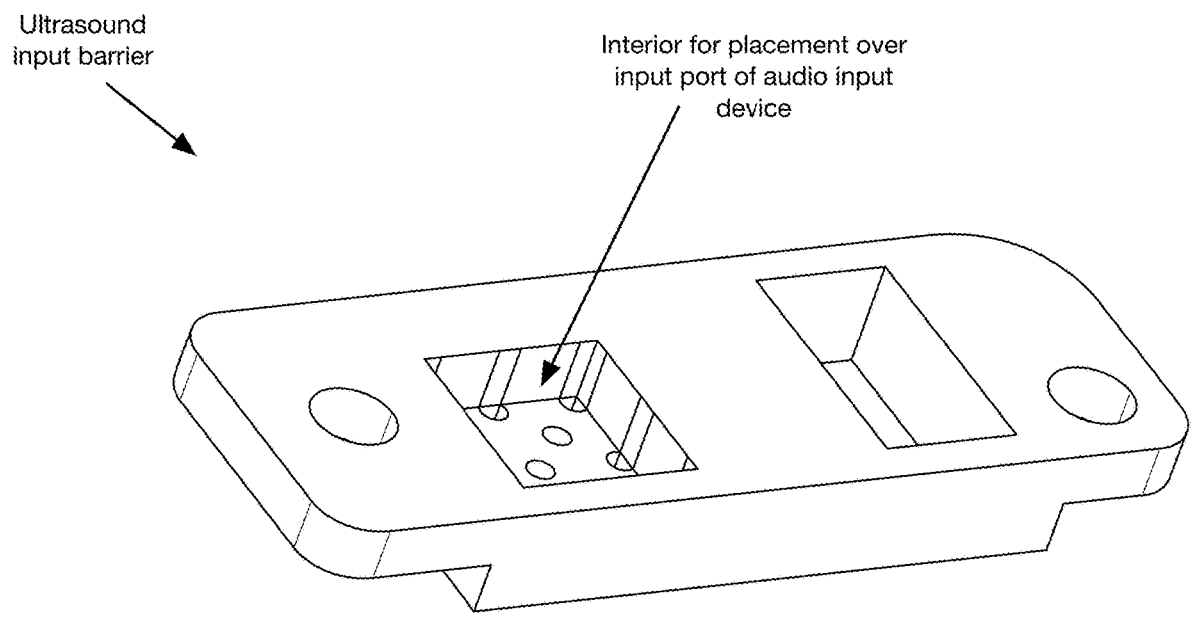
Figures 10C, 10D:
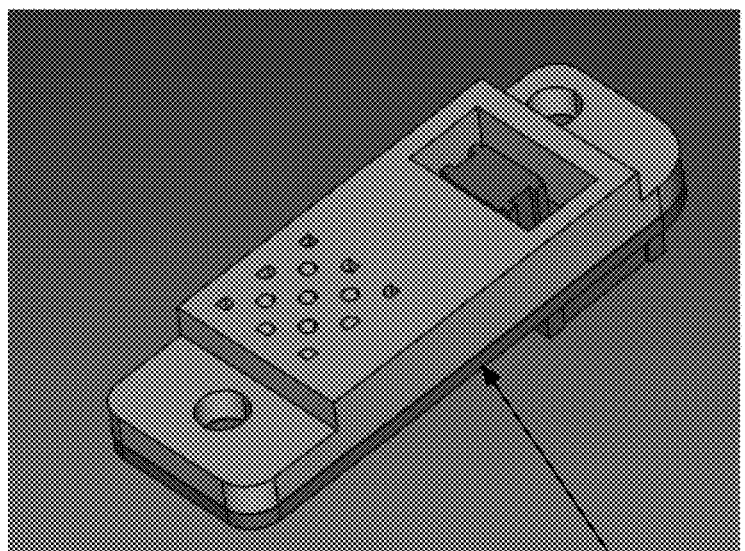

The tactile stimulation device preferably includes a housing, where the housing defines a set of surfaces (walls) including a superior surface (e.g., as shown in FIGS. 5A-5E, as shown in FIGS. 9A-9B). The superior surface is preferably configured to enable transmission of ultrasonic waves (equivalently referred to herein as ultrasonic pressure waves) as produced by the set of transducers, through the superior surface, and out of the tactile stimulation device (e.g., into the mid-air tactile interaction volume) such that the user can feel the ultrasonic tactile sensation. Additionally or alternatively, another surface can confer such functionality, multiple surfaces can confer such functionality, and/or the housing can be otherwise configured.

The superior surface preferably enables the transmission of ultrasonic waves with a set of apertures defined through the superior surface, where the apertures are sized and/or spaced to enable transmission of waves in the ultrasonic frequency range (e.g., 40 kHz, between 35-55 kHz, etc.). Additionally or alternatively, a layout pattern (e.g., grid, aligned rows, mis-aligned rows, series of concentric circles, spiral, random placement, etc.) of the apertures can be configured for such a purpose.

In a set of preferred variants (e.g., as shown in FIGS. 9A-9B), the superior surface defines a set of circular apertures each having a diameter $d1$ and a spacing (center-to-center distance) of $D1$. The diameter $d1$ is preferably at least 1 millimeter (mm) and further preferably greater than 1 mm (e.g., between 1-10 mm, between 2-10 mm, between 2-5 mm, between 1-20 mm, between 3-6 mm, any ranges in between and/or encompassing these, any portions of these ranges, etc.), and the spacing $D1$ is preferably at least 2 mm (between 5-10 mm, between 2-20 mm, between 4-12 mm, any ranges in between and/or encompassing these, any portions of these ranges, etc.), but can additionally or alternatively be otherwise sized.

In alternative variants, the apertures can be non-circular (e.g., square, triangular, ovoid, etc.), the apertures can have differing diameters relative to each other, the apertures can have different spacings relative to each other, the apertures can be arranged in another layout, and/or the apertures can be otherwise configured.

Additionally or alternatively, a material of the housing (e.g., metal, plastic, ceramic, wood, etc.) can be configured to enable such transmission (e.g., additional to the apertures, absent of the apertures, etc.).

The internal cavity of the housing preferably functions to house any or all components of the system, further preferably including the transducers, audio input devices, any ultrasound input barriers, any audio input barriers, and/or any associated components (e.g., power sources, communication components, etc.).

The system 100 can optionally include and/or interface with an extended reality (XR) subsystem, which can include any or all of: a virtual reality (VR) system, an augmented reality (AR) system, a mixed reality (MR) system, any combination of systems, and/or any other suitable computing system and/or immersive computing system. The XR system preferably functions to provide digital content with which a user interacts in a virtual or augmented environment (e.g., a gaming environment, a task environment such as a virtual surgical environment for use with robotic surgical tools, multi-user virtual communication/interactions, etc.), but can additionally or alternatively perform any suitable functions.

Additionally or alternatively, the system can be implemented in absence of an XR system, such as with a set of display devices (e.g., televisions, monitors, computer screens, etc.), in absence of display devices, with other supplementary devices (e.g., objects, connected devices, etc.), and/or with any other subsystems.

The XR system preferably includes and/or interfaces with a tracking subsystem, which functions to track any or all of the user for use in providing: tactile content, visual content, audio content, and/or any other suitable content. The content can be adjusted in any or all of the following ways based on user actions, such as in: temporal properties of the content (e.g., when content is introduced and applied to the user, when content is adjusted, etc.); where content is applied or adjusted (e.g., in which regions of a tactile interaction volume, which portions of a digital object are applied as tactile sensation, etc.); transformation of the content (e.g., rotation, scale, translation, magnification, de-magnification, skew, etc.); how content is applied or adjusted (e.g., at which intensity tactile sensation is applied; spatial location of content; temporal variation in parameters of tactile content such as intensity, rate, shape, etc.; etc.); which content is applied or adjusted (e.g., which digital objects are represented through tactile sensation in a tactile interaction volume; which digital objects are visually displayed to the user; etc.); and/or in any other suitable ways.

The XR system can include any number of supplementary devices, such as displays (e.g., holographic displays, screens, etc.), headwear (e.g., VR headset, head mounted display, AR glasses, etc.) and/or other wearables, controllers (e.g., handheld gaming controllers), audio systems (e.g., speakers, headphones, etc.), and/or any other suitable devices.

The supplementary devices can perform any or all of: receiving one or more user inputs (e.g., through one or more buttons of a controller); providing one or more outputs to a user (e.g., a visualization of digital objects, a visualization of virtual objects in gaming, etc.); and/or performing any other suitable functions.

The system can additionally or alternatively interface with any other supplementary devices, such as mobile and/or user devices (e.g., mobile user device executing an application which provides content at the extended reality subsystem).

3.2 System—Audio Input Devices

The system 100 preferably includes a set of audio input devices (e.g., microphones), which function to receive audio information from users interacting with each other in an immersive experience. The audio input devices are preferably part of (e.g., integrated within) the tactile stimulation device, but can additionally or alternatively be part of the extended reality subsystem, independent of these components, and/or arranged at any combination of components. The audio input devices can optionally further function to prevent, eliminate, and/or minimize one or more unwanted audio sources, such as that resulting from aliased ultrasound (e.g., through the use of analog microphones, through the use of digital microphones having a high sampling frequency, etc.), and/or any other audio sources. Additionally or alternatively, any or all remaining components of the system can perform said function, or the audio input devices can collectively perform said function with other components of the system.

The audio input devices preferably include a set of microphones (e.g., as described below), but can additionally or alternatively include any other devices configured to detect and/or receive audio information (e.g., information between 20 Hertz [Hz] and 20 kilohertz [kHz]) and/or any other signals. The microphones can include digital microphones, analog microphones, or any combination of microphones.

In a first set of variants, for instance, the audio input devices include digital microphones, which sample the received analog signals (e.g., audio information) at a particular set of one or more sampling frequencies to create a digital signal.

In a first example, the sampling frequency of the digital microphone is less than twice the frequency of the ultrasonic pressure waves (e.g., less than 2 times 40 kHz), which results in an aliased signal having a frequency in the audible range (e.g., 6 kHz, 8 kHz, between 20 Hz and 20 kHz, between 1 kHz, and 20 kHz, between 2-10 kHz, etc.) (e.g., according to the Nyquist sampling rule) being represented in the received audio information. This aliased sound is undesirable (e.g., not corresponding to information, unpleasant and/or confusing to hear, etc.), and would get transmitted to other users if not accounted for by features of the system and method (e.g., the use of an ultrasound input barrier, the use of trained machine learning model, etc.). As such, the system and/or method described herein can confer the benefit of eliminating and/or minimizing this aliased sound.

In a second example, the sampling frequency of the digital microphone is at least as large as twice the frequency of the ultrasonic pressure waves (e.g., ultrasound frequency produced by the transducers), which functions to prevent producing this aliased signal.

In a second set of variants, the set of microphones includes analog microphones configured to receive analog information from the environment (e.g., prior to performing a sampling process).

In an example of this second set of variants, a filter (e.g., notch filter, low-pass filter, etc.) is utilized in the system which functions to filter out the ultrasound frequency, such that this frequency is not present in the signal when it is sampled.

In a third set of variants, the audio input devices include a combination of digital and analog microphones.

The microphones can optionally be placed within the cavity at particular locations (e.g., with particular spacings relative to each other [e.g., at least 5 inches, between 6-12 inches, etc.], proximal to corners of the device, with particular offsets relative to the superior surface, etc.) that are optimized to prevent any or all audible effects. In some variants, for instance, the microphones are placed at maximal or near-maximal distances (e.g., at adjacent corners of the device, at diagonal corners of the device, etc.) relative to each other, which can function to achieve differences in the level and/or type of noise picked up by the microphones, thereby enabling the noise to be more easily identified and subsequently removed.

The microphones are preferably oriented such that the microphone sound apertures (e.g., input ports) are coupled (e.g., through air) to the outside of the tactile device unit (e.g., closest to the superior surface). This can function, for instance, to prevent ultrasonic waves that exist and reflect (e.g., rattle around) within (e.g., are formed in, enter into, etc.) the internal cavity of the device from entering the microphone structure. For instance, in some instances, ultrasound reflects off printed circuit boards or other components in the cavity of the device, which would be undesirable to pick up by the microphones. Additionally or alternatively, the microphones can be oriented differently (e.g., angled, pointed toward an inferior surface, pointed in different directions relative to other microphones to pick up different signals, etc.).

In a preferred set of variations, each user interacting in a multi-user environment has a tactile stimulation device and extended reality subsystem (e.g., headset device), where the tactile stimulation device includes a set of microphones which record audio from the users such that it can be provided to the other users of the multi-user environment, enabling the users to communicate with each other (e.g., remotely).

3.3 System—Set of Barriers

The system preferably includes a set of barriers, which function to prevent reception and/or retention (e.g., for further processing) of undesired signals, which could be conveyed to any or all users taking part in tactile stimulation and/or remote communication. In preferred variants, for instance, the set of barriers function to block undesired signals from reaching input ports of the audio input devices, such that the undesired signals are not transmitted to another user taking part in a multi-user experience. Additionally or alternatively, the set of barriers can perform any other functions.

The barriers preferably include physical barriers (e.g., physical filters) which confer—through physical geometrical properties—their functionality (e.g., of blocking signals, of reflecting signals, etc.). Additionally or alternatively, the barriers can include software filters, filters defined by circuitry, acoustic barriers, physical barriers that achieve functionality through material properties and/or placement, and/or any other types of barriers.

The set of barriers preferably includes a set of ultrasound input barriers, which function to minimize and/or eliminate any or all of the audible effects caused by audio input devices (e.g., onboard the tactile stimulation device) picking up ultrasound signals (e.g., as described above) from transducers of the tactile stimulation device. If this information is picked up and played back (e.g., to the user associated with the tactile stimulation device, to a second user that the user is communicating with, etc.), such as through a set of speakers, it can result in undesired and/or unpleasant audio. The set of ultrasound input barriers can optionally additionally function to prevent undesired audio from naturally occurring (e.g., absent of microphone detection) and/or can otherwise perform any other suitable functions.

The ultrasound input barriers can further additionally function to decrease an amplitude of ultrasonic input that is received at the audio input devices such that the ultrasound waves do not saturate the microphone, which could prevent desired audio from being received and/or processed at the audio input device.

The ultrasound input barriers preferably include physical barriers that are placed proximal to the audio input devices and function to prevent the ultrasonic pressure waves from being detected by the audio input device. In preferred variations, for instance, the ultrasound input barriers are placed at an offset (e.g., between 1-3 mm, greater than 1 mm, greater than between 0.1 and 0.5 mm, between 2-3 mm, between 0.1-10 mm, greater than 10 mm, etc.) from input ports of the microphones (e.g., proximal to but offset). Additionally or alternatively, ultrasound input barriers can be placed over (e.g., with no offset) ports of each of the set of microphones onboard the tactile stimulation device and/or at any other locations relative to any suitable audio input devices.

In a preferred set of variants, the ultrasound input barriers are arranged between an input port of each audio input device and the superior surface of the tactile stimulation device. This is further preferably inferior to the set of transducers such that the ultrasound input barrier does not impede ultrasonic waves from being transmitted to the tactile interaction volume, but can additionally or alternatively be to the side of the transducers, above any or all transducers, and/or otherwise placed. Additionally or alternatively, the ultrasound input barriers can be located inferior to the superior surface and the input port, superior to the superior surface and the input port, to the side of either or both of these components, and/or at any other locations.

The ultrasound input barriers preferably define a set of apertures which function to block and or reduce (e.g., significantly reduce, reduce by an order of magnitude, reduce by at least half, reduce by at least a tenth, etc.) an amplitude associated with ultrasonic signals produced by the tactile stimulation device. This can be enabled through any or all of: a size of the set of apertures, a shape of the set of apertures, a spacing of the set of apertures, an arrangement of the set of apertures, and/or any other features. Additionally or alternatively, material properties of the ultrasound input barriers (equivalently referred to herein as metamaterials), geometrical properties (e.g., shape, thickness, curvature and/or flatness, angle of orientation relative to the input port, etc.) of the ultrasound input barriers, and/or any other features can function to block or reduce these signals.

Figure 7:
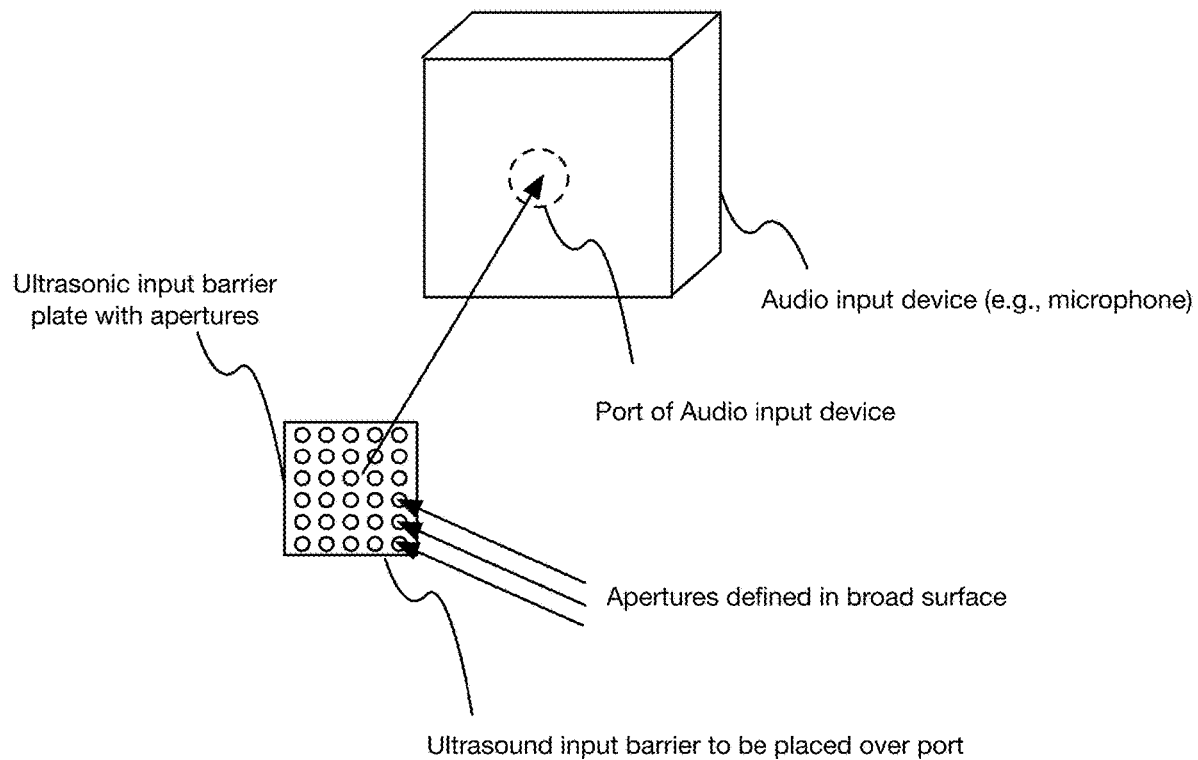
FIG. 7 depicts another variation of an audio input device and ultrasound input barrier.

In a first set of variants (e.g., as shown in FIG. 7, as shown in FIGS. 10A-10D), the ultrasound input barrier includes a plate defining a set of apertures through a broad surface (e.g., largest surface, surface having the smallest thickness, etc.), where the plate reduces and/or blocks ultrasonic signals (e.g., 40 kHz waves, waves having a frequency greater than 20 kHz, waves produced by the transducers) from being received back at the audio input device port from the user's environment. The apertures are preferably smaller in size than those of the superior surface (if applicable) and closer spaced, but can additionally or alternatively be otherwise sized, spaced, or varied in size and/or space. In a set of examples, the set of apertures are circular and have a diameter (e.g., average diameter, uniform diameter, etc.) of between 0.5 and 2 millimeters (mm) (e.g., 1 mm, 1.25 mm, 1.5 mm, 1.75 mm, any value in the range, etc.), but can alternatively have a diameter below 0.5 mm (e.g., between 0 and 0.5 mm, 0.25 mm, etc.), above 2 mm (e.g., between 2-5 mm) and/or any other dimension(s) with any suitable shape(s). The apertures are preferably spaced at a closer distance than those in the superior surface of the tactile device (if applicable), but can alternatively be further spaced, or any combination of spaced. In specific examples, the apertures have a center-to-center spacing (D2 value) of between 1-5 mm (e.g., between 2-3 mm, between 1-3 mm, etc.) but can additionally or alternatively have spacings of less than 1 mm, greater than 5 mm, and/or any other spacings. The thickness of the plate perpendicular to the broad surface is preferably between 0.1 and 5 mm (e.g., between 1-2 mm, between 0-3 mm, between 1-3 mm, etc.), but can alternatively be less than 0.1 mm, greater than 5 mm, a varied thickness, and/or any other thicknesses. The apertures can be arranged in a grid, arranged in concentric circles, arranged in a spiral, arranged in rows, arranged in a random arrangement, and/or otherwise suitably arranged.

The plate is preferably plastic (e.g., 3D-printed nylon), but can additionally or alternatively include metal, wood, fiber, fabric, paper, adhesive, organic materials, inorganic materials, rubber, polymers, and/or any other material(s).

Figure 6:
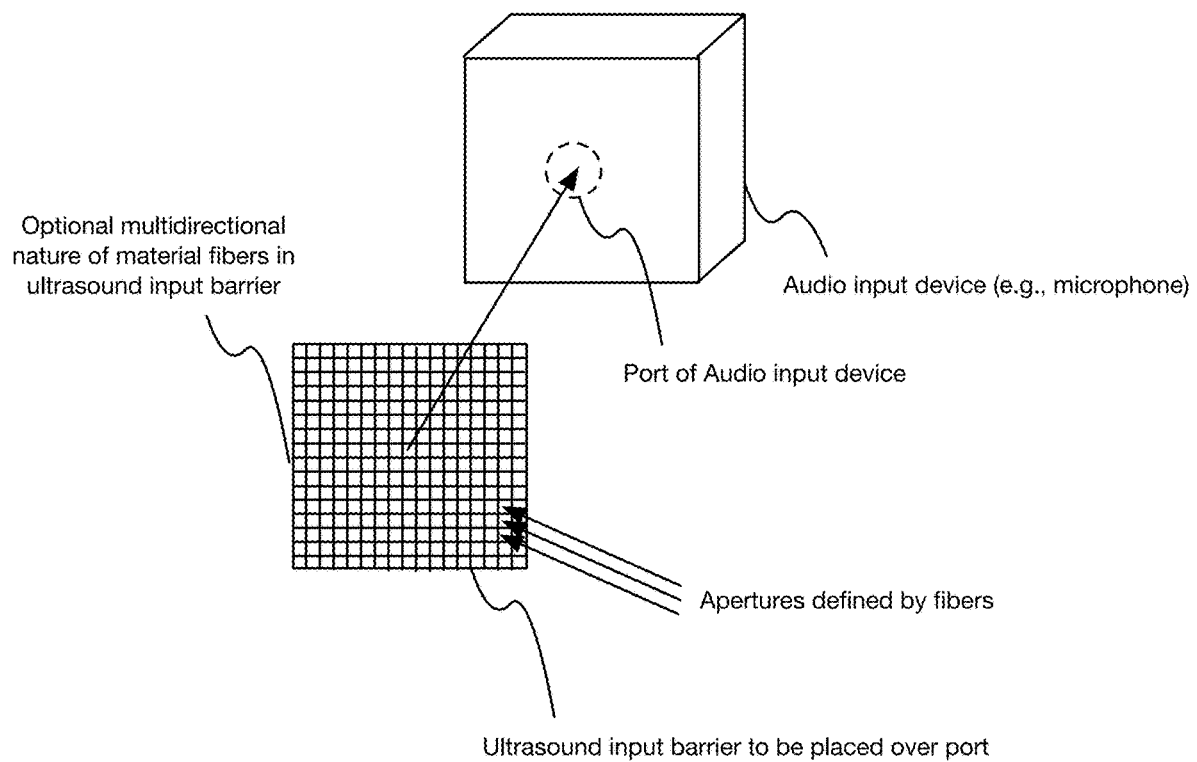
FIG. 6 depicts a variation of an audio input device and ultrasound input barrier.

In a second set of variants (e.g., as shown in FIG. 6), the ultrasound input barrier includes a set of one or more sheets (e.g., film, tape, etc.) having a broad surface significantly greater than its thickness. The sheet is preferably composed of a paper material, but can additionally or alternatively be made from any or all of: other fibrous materials, fabric (e.g., cotton, silk, linen, denim, etc.), polymeric materials (e.g., plastic), adhesive materials, wooden materials, metallic materials, and/or any other materials or combination of materials. Further additionally or alternatively, the ultrasound input barriers can include form factors other than a sheet. The ultrasound input barriers further preferably define and/or include a set of geometrical properties, such as directional properties associated with the material(s) of the ultrasound input barriers (equivalently referred to herein as ultrasound barriers). In preferred variations, for instance, the ultrasound barriers include fibers which are aligned along the same direction. Additionally, the ultrasound barriers can include a second sheet and/or layer which is overlaid in the first, wherein fibers of the second sheet and/or layer are aligned in a perpendicular direction relative to the first sheet and/or layer (e.g., as shown in FIG. 6) and create apertures by nature of any or all of: the spacing between fibers (e.g., having dimensions as described above, having dimensions smaller than the apertures described above, having effective diameters of less than 0.5 mm, having effective diameters between 0-0.1 mm, having effective diameters between 0-0.5 mm, having effective diameters between 0-1 mm, having effective diameters large enough to not completely block all signals, etc.), the fiber and/or filter sizes (e.g., width, length, thickness, depth of the material, thickness perpendicular to a broad surface, surface area, etc.) and/or any other features (e.g., density, porosity, elasticity, rigidity, etc.). Additionally or alternatively, more than 2 sheets and/or layers can be used, the fibers can be mis-aligned and/or oriented in multiple directions within each sheet and/or layer, each sheet and/or layer can have a grid formation, and/or the ultrasound barriers can be otherwise designed and/or combined.

In some variants, for instance, the fiber spacing and/or size (e.g., thickness of barrier along direction perpendicular to broad surface plane) create a frequency dependent scattering which blocks the ultrasound waves.

The system can optionally include a set of alignment features configured to properly align (e.g., in a parallel planar fashion) and/or offset the ultrasound input barrier relative to the input port(s).

Additionally or alternatively, ultrasound barriers in the form of signal processing filters (e.g., software filters, circuit filters, etc.) can be implemented to remove the corresponding signals (e.g., aliased signals produced from sampling ultrasonic signals, frequencies of signals above a predetermined threshold, etc.) from further processing and/or output at a set of speakers.

In a set of specific examples, for instance, the set of ultrasound input barriers include a set of capacitors and/or resistors and/or inductors in the form of a notch filter and/or low-pass filter configured to remove ultrasound frequencies from the incoming signal.

Further additionally or alternatively, the ultrasound input barriers can include and/or interface with any or all of: screens, perforated plates, acoustic filtering structures (e.g., Helmholtz resonators, meta material structures, resonance cavities, etc.), and/or any other materials and/or components.

The system can optionally additionally or alternatively include a set of audio output devices (e.g., speakers) which function to provide audio information to the users. The audio output devices are preferably part of the tactile interface subsystem (e.g., integrated into a headset), but can additionally or alternatively be part of the tactile stimulation device, outside of either component, and/or at any combination of components.

The set of barriers can optionally additionally or alternatively include a set of audio input barriers, which function to prevent certain audio information from being received at the input ports of the audio input devices.

In some implementations, for instance, audible noise occurring and/or created in an interior cavity of the tactile stimulation device and/or outside the tactile stimulation device is prevented from being received at the audio input device ports through the use of an audio input barrier. For instance, one source of this noise can occur in the form of phase change noise resulting from adjusting (e.g., moving the location of) the produced tactile sensation, which can be achieved through changing the phase values associated with the transducers. In this, a certain phase is applied to each transducer to produce tactile sensation at a set of points in space. At a predetermined frequency (e.g., every 2-10 milliseconds), the locations of the tactile sensation is changed (e.g., to adapt to user interactions, as prescribed as part of a content stream, etc.), which is done through applying different phase values to the transducers. Audible noise is produced in this transition, which can occur in both the transducers themselves (e.g., as a byproduct of switching the phase, the transducers have some response in the audible range which gets picked up by the microphone) and/or at the focal point locations themselves, which get picked back up at the microphone.

Figure 5A:
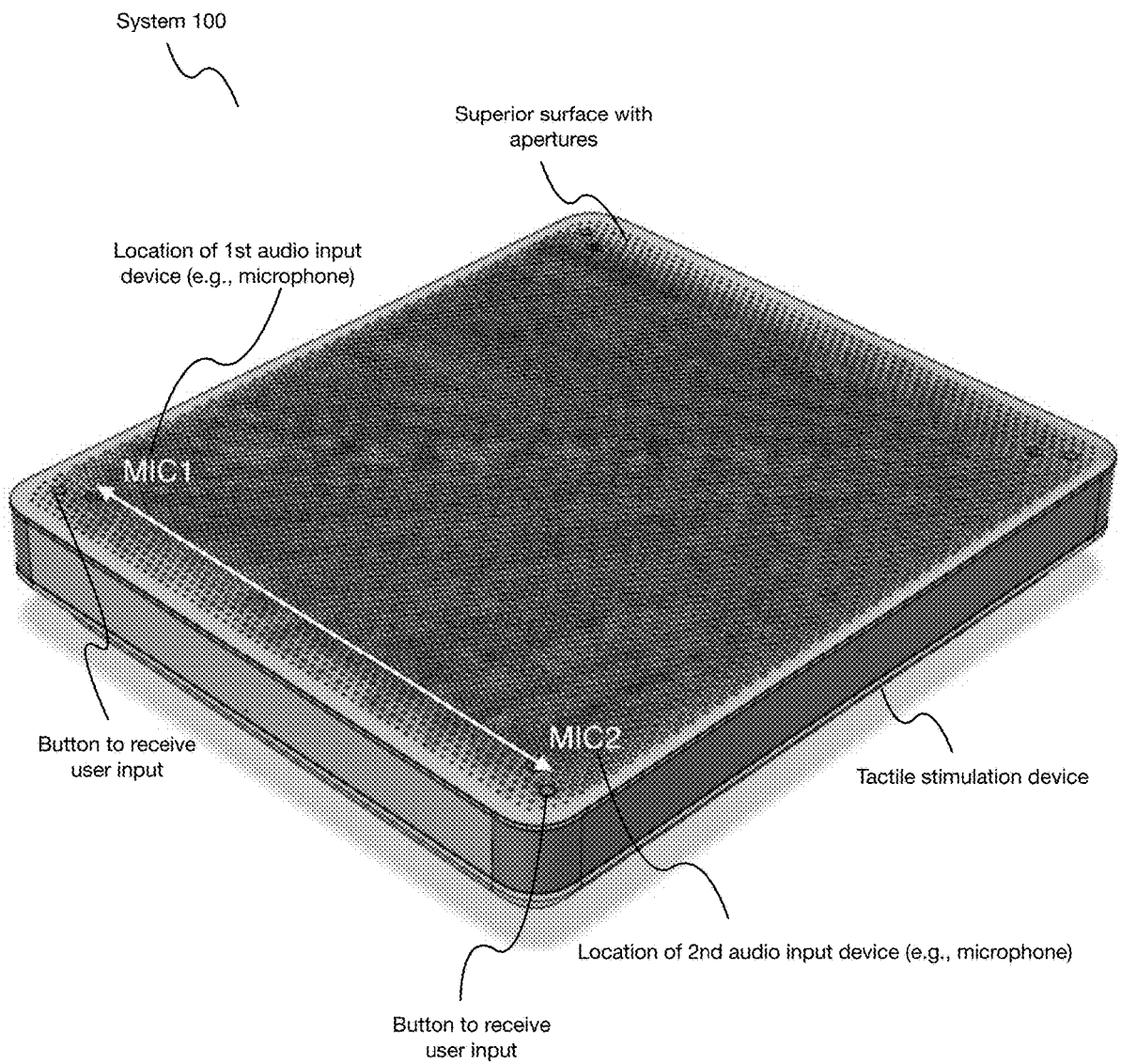
FIGS. 5A-5E depict an example of a system for reducing audible effects of ultrasonic stimulation.
Figure 5B:
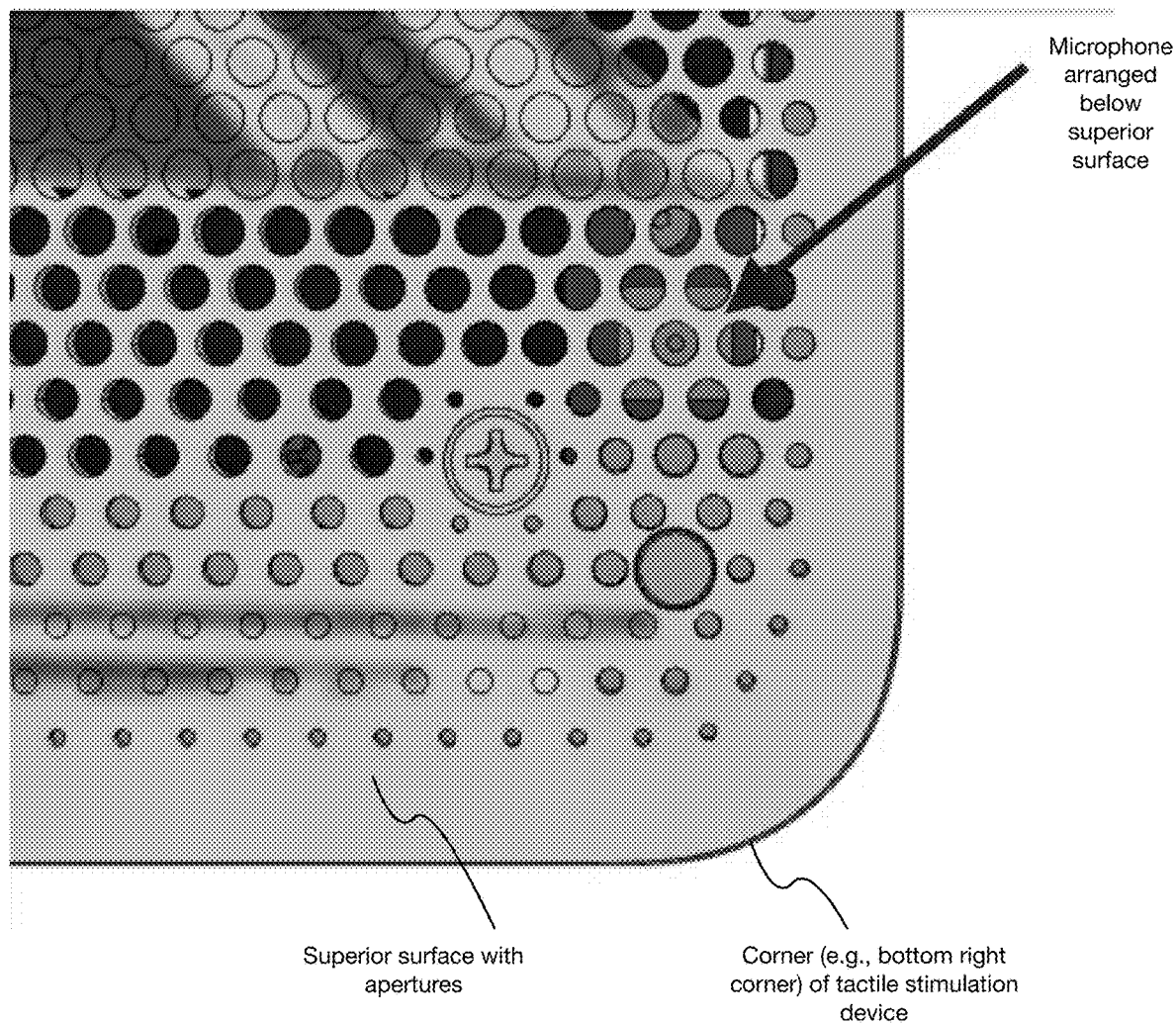
Figure 5C:
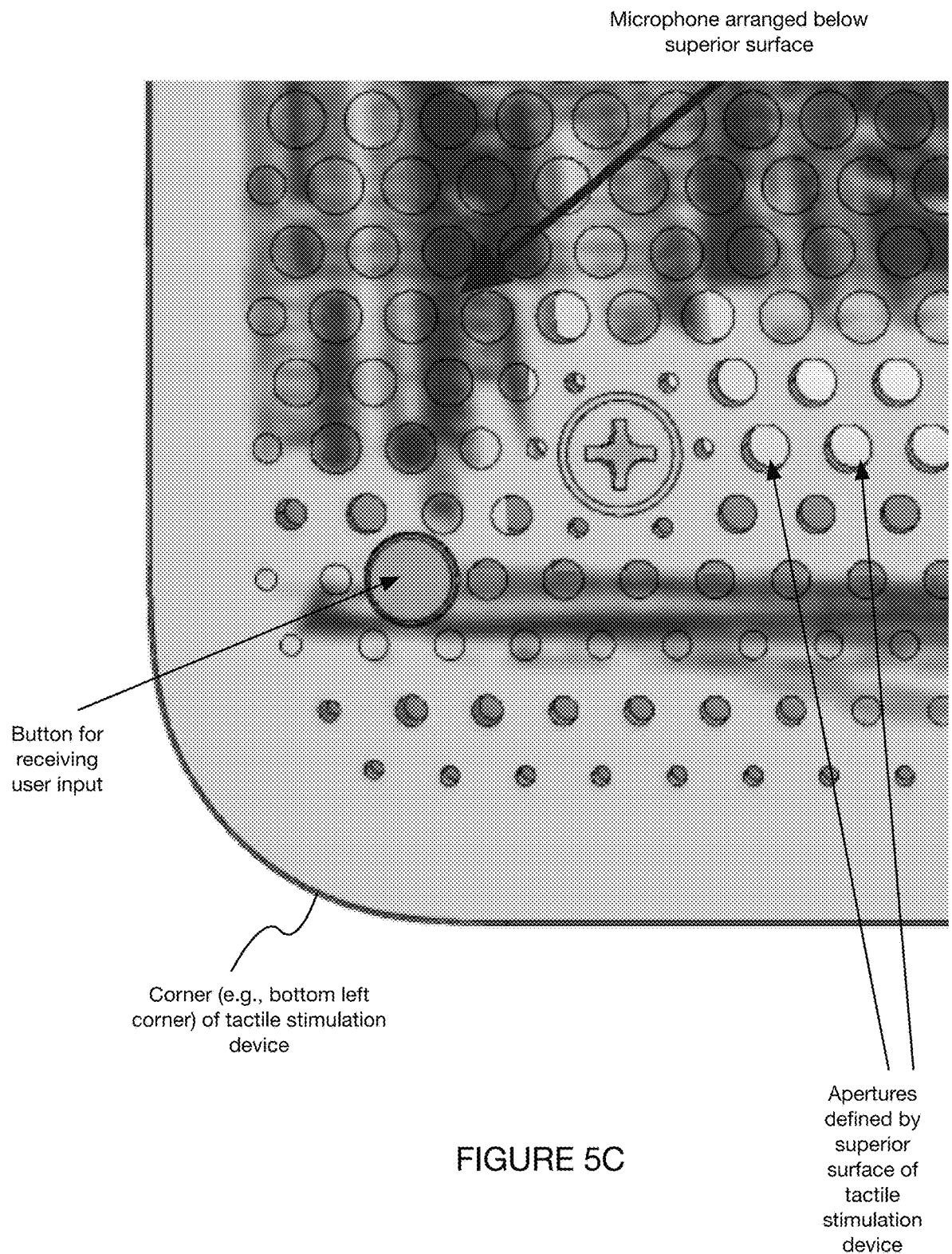
Figure 5D:
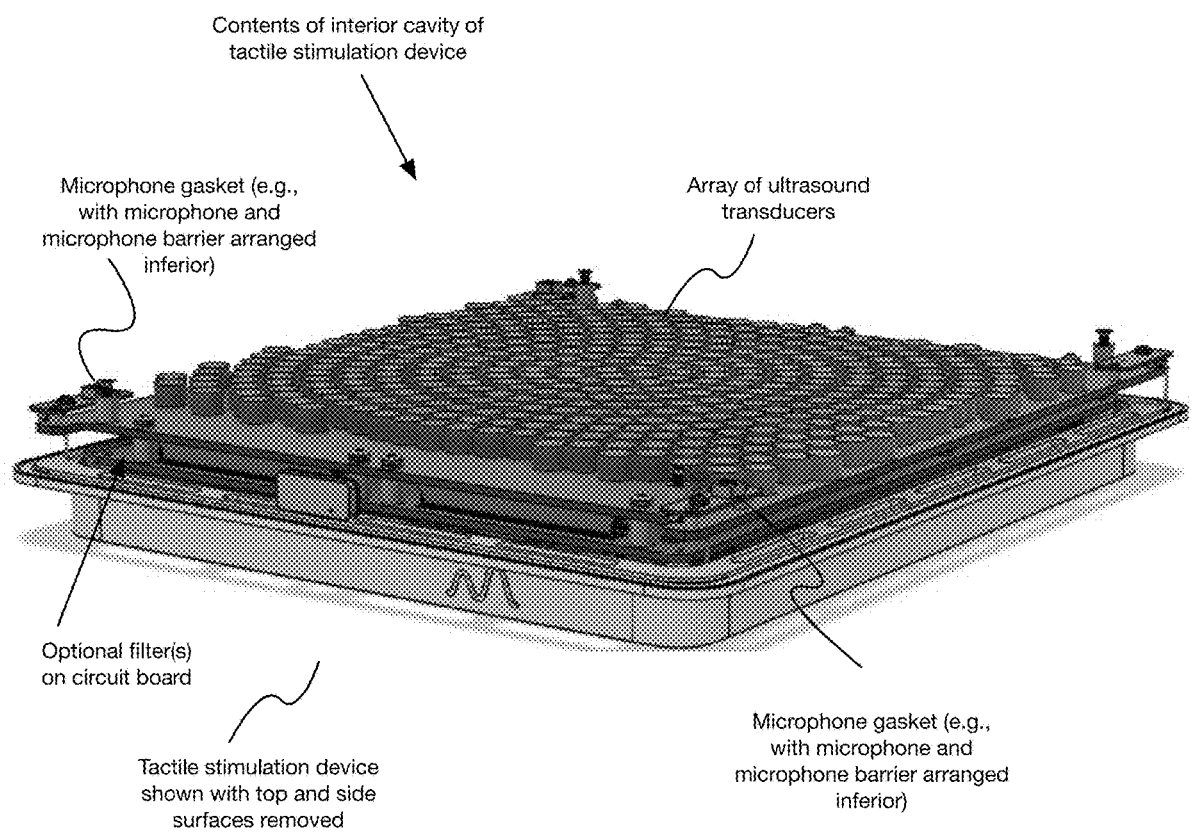
Figure 5E:
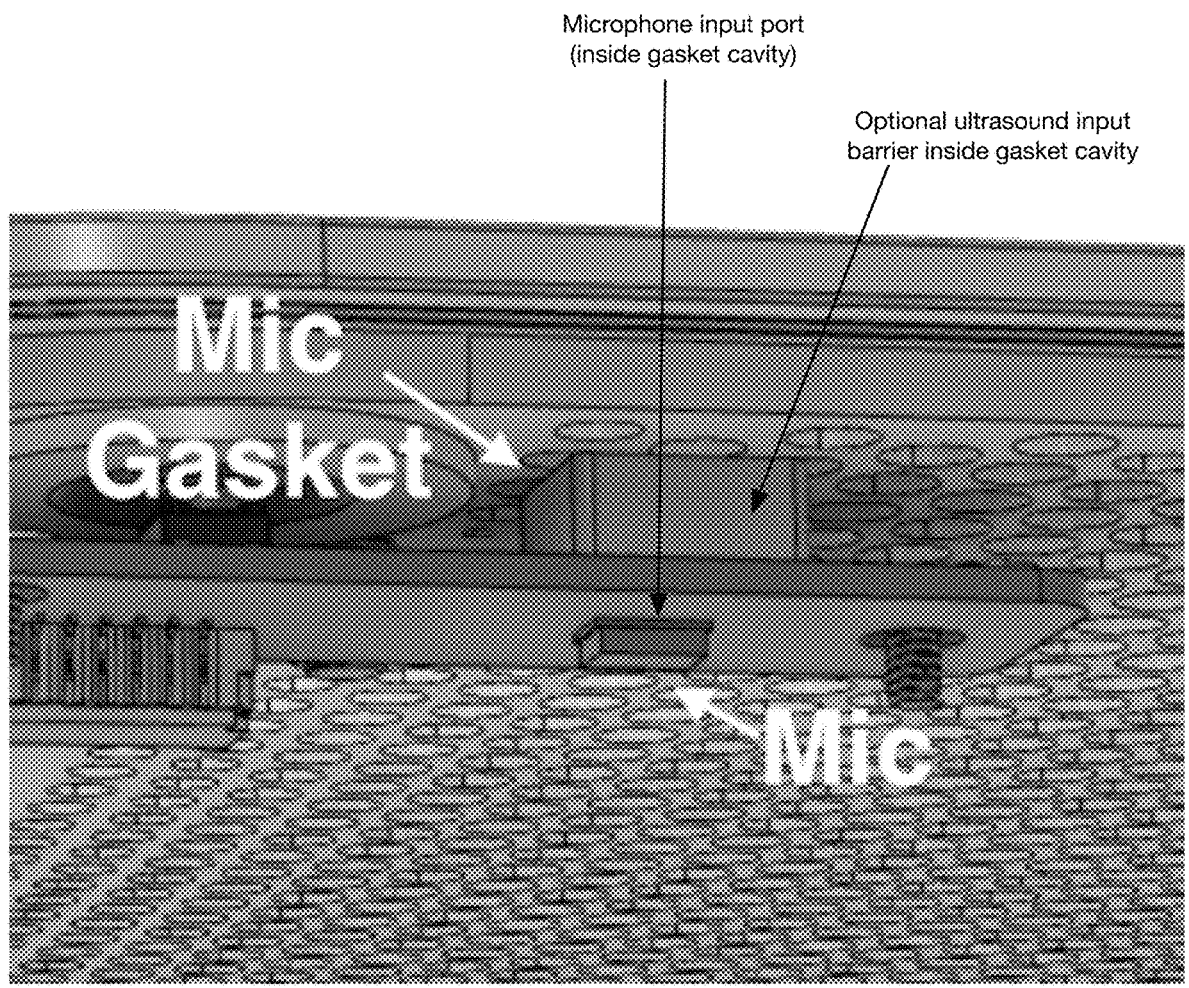

In a preferred set of variants, the audio input barrier includes an enclosure surrounding the audio input device port, such as a gasket (e.g., as shown in FIGS. 9A-9B, as shown in FIG. 5E), which can reduce and/or minimize any or all of the phase change noise described above. The gasket is preferably rubber or another compliant material (e.g., configured for dampening), but can additionally or alternatively include a rigid material (e.g., plastic, metal, wood, etc.), other compliant material (e.g., fabric), or any other material(s).

The audio input barrier(s) can additionally or alternatively minimize and/or prevent any other audible effects.

3.4 System—Other Components

Additionally or alternatively, the system 100 can include and/or interface with any other components, such as, but not limited to: a set of processors (e.g., onboard the tactile device, at a remote cloud-based server, etc.), a set of models and/or algorithms (e.g., as described below), data storage, data memory, and/or any other component(s).

4. Method

As shown in FIG. 2, the method 200 includes any or all of: collecting information from each user of a set of users at a set of audio input devices S100; processing the audio information S200; and transmitting the processed audio information to any or all of the set of users S300. Additionally or alternatively, the method 200 can include any other suitable processes.

The method functions to mitigate certain audible effects (e.g., audible artifacts, audible distortions, noise, etc.) associated with the system and/or method. These preferably include unwanted audible effects, such as, but not limited to: audible effects caused by providing ultrasonic stimulation; audible effects caused by adjusting ultrasonic stimulation; audible effects caused by audio input devices arranged in close proximity with audio output devices; unwanted noise (e.g., audio other than speech, gaming noises, etc.); any other audible effects; and/or any combination of audio effects.

When using ultrasonic stimulation devices, the produced ultrasonic stimulation (equivalently referred to herein as ultrasound and ultrasound stimulation and/or ultrasound waves), which refers to a pressure wave produced in the air, can cause audio input devices to pick up the ultrasonic signals—even though the frequency of ultrasonic stimulation (e.g., 40 kilohertz [kHz]) itself is not audible to humans. For instance, many microphones (e.g., digital microphones) pick up a wide range of acoustic frequencies through sampling a signal, even when some of those signals are outside of the audible range. As the microphone samples this signal (e.g., at 44.1 kHz, at 48 kHz, at less than twice the ultrasound frequency, etc.), an aliasing effect can occur, which results in a lower frequency, audible sound (e.g., between 5-15 kHz, between 6-10 kHz, 8 kHz, etc.) being continuously produced, causing annoyance and/or confusion to the user.

Another unwanted audible effect that can be produced, especially when providing ultrasonic stimulation, can result from adjusting the ultrasonic stimulation for provision at different locations. In some variations, to adjust the location (and/or other parameters) of the produced ultrasonic stimulation, the phase values associated with the transducers are rapidly (e.g., abruptly, in quick succession, etc.) adjusted, resulting in an audio impulse which has a wide spread of frequencies, some of which are in the audible range. In examples of ultrasonic stimulation devices with a plurality (e.g., hundreds, between 50 and 500, between 300 and 500, thousands, etc.) of transducers, which are frequently changing phase in order to provide dynamic stimulation to the user, these audible effects can be frequent (e.g., continuous) and undesired.

In specific embodiments, for instance, the phase (e.g., timing) of an electronic signal applied to a transducer is changed, which causes a drive signal of the transducer to contain a range of frequencies at the moment of phase change. This range of frequencies now emitted from the transducer can produce acoustic signals in the audible (e.g., audio) range when they interact with air and/or other absorbers/reflectors.

Yet another unwanted audible effect can occur due to feedback caused by microphones and speakers being arranged in close proximity. For instance, in variations in which the user is utilizing a tactile stimulation device with a microphone along with a headset or other extended reality (e.g., virtual reality [VR], augmented reality [AR], etc.) device having a speaker, the microphone of the electrical stimulation device can cause feedback noise to be repeatedly amplified and played at the speaker, leading to unwanted sound.

Yet another unwanted audible effect can include non-speech audio in an environment of the users (e.g., gaming noises, environmental noise, etc.).

As such, the method 200 preferably functions to mitigate and/or eliminate any or all of these audible effects. Additionally or alternatively, any or all of the system can function to mitigate and/or eliminate any or all of these audible effects (e.g., preventing non-audible information from being picked up at one user's microphone and transmitted to speakers of another user).

The method 200 is preferably configured for use in a multi-user immersive experience in which multiple users, optionally located remotely from each other, are able to communicate and/or interact in any or all of: audio, visual, and tactile manners. In preferred variations, for instance, multiple users can take part in an immersive experience together and in a remote fashion, where each of the users has his or her own tactile stimulation device as well as any number of extended reality devices, such that tactile stimulation and audio information can be provided to the users as they interact with each and with the tactile stimulation.

Additionally or alternatively, the method 200 can be configured for any other use cases.

4.1 Method—Collecting Audio Information from Each User of a Set of Users at a Set of Audio Input Devices S100

The method 200 preferably includes collecting audio information from a set of users at a set of audio input devices S100, which functions to receive audio information with which to enable users to interact (e.g., converse) in an immersive environment.

S100 is preferably performed throughout (e.g., continuously throughout) one or more users' interactions with each other and/or with virtual content in an immersive environment (e.g., XR environment, AR environment, VR environment, etc.). Additionally or alternatively, S100 can be performed in response to a trigger (e.g., a user indicating that he or she is talking, a detection that a user is providing audio information above a predetermined loudness threshold, etc.), at a predetermined frequency and/or set of intervals, and/or at any other times and/or within any suitable environments or contexts.

The method preferably enables the users to be located remote from each other, such that audio information from remote users (e.g., participating in a multi-user environment) can be collected and provided to other users in intelligible, natural ways (e.g., with minimal lag, with minimal distortion, etc.). Additionally or alternatively, any or all of the users can be local relative to each other (e.g., in the same room, in the same building, etc.), any combination of local and remote, and/or in any other configurations.

The audio information preferably includes spoken dialogue from users as they converse with each other (e.g., remotely, in person, etc.) while contemporaneously (e.g., simultaneously, overlapping, partially overlapping, etc.) taking part in an immersive experience. Additionally or alternatively, the audio information can include audio other than dialogue (e.g., sound effects, sounds occurring in a game, etc.). The immersive experience can include, for instance, any or all of: a set of games (e.g., AR games, VR games, etc.), a virtual chat room, a virtual task and/or activity simulator, any activities provided as part of an extended reality (e.g., AR, VR, etc.) environment, a video conferencing solution, and/or any other experiences. Additionally or alternatively, users can be interacting outside of an immersive environment and/or in any other environments.

The audio information is preferably collected at a set of audio input devices, and further preferably a set of audio input devices arranged onboard the tactile stimulation device. Additionally or alternatively, audio input devices can be arranged onboard supplementary devices (e.g., extended reality headset), otherwise arranged in an environment of the user, and/or at any other locations.

Figure 4:
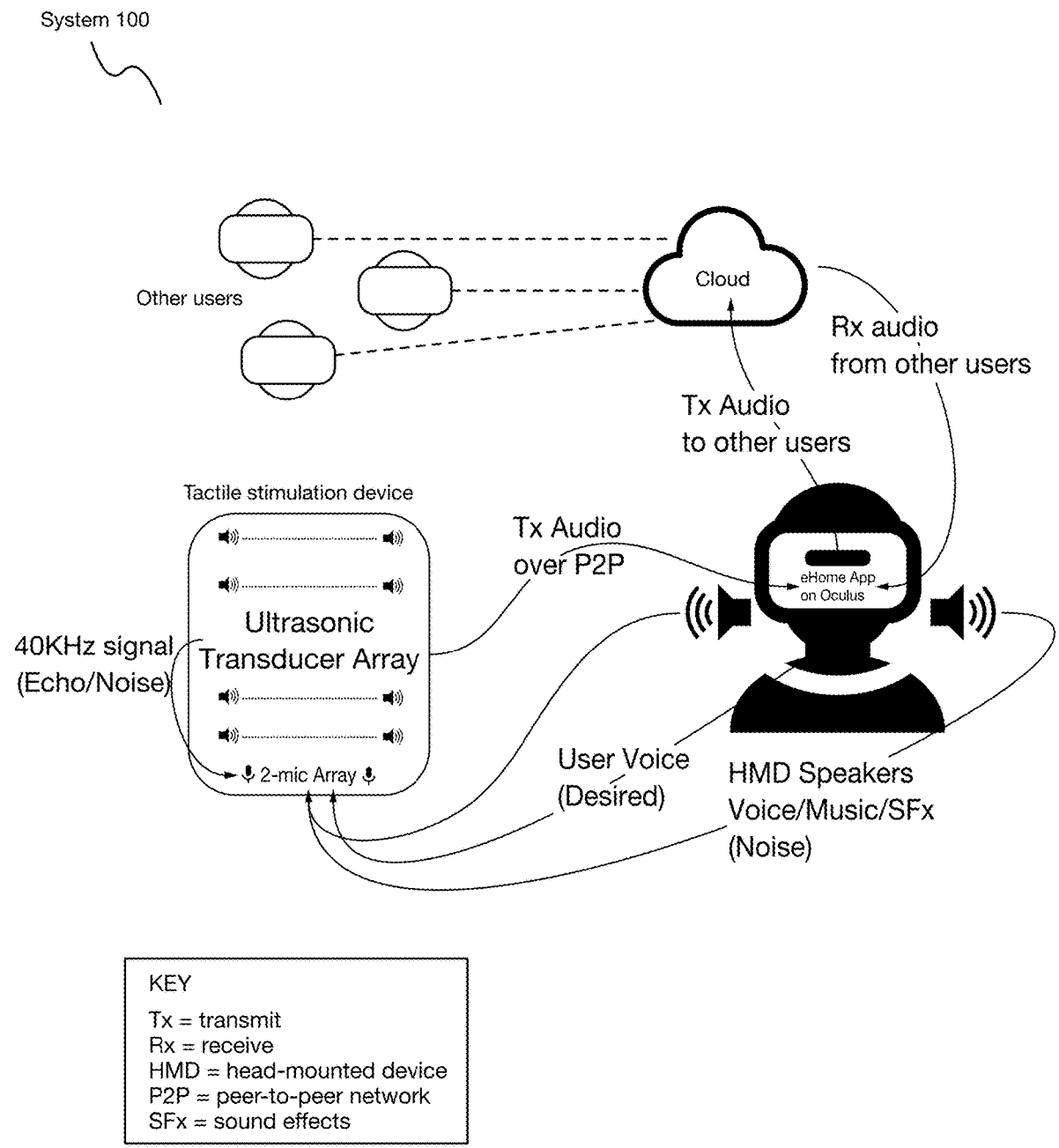
FIG. 4 depicts a variation of a system for reducing audible effects of ultrasonic stimulation.

In a first set of variations (e.g., as shown in FIG. 4), a set of audio input devices are arranged onboard the tactile stimulation device. In set of examples (e.g., as shown in FIGS. 5A-5E), for instance, a set of multiple microphones are arranged in a housing of the tactile stimulation device, such as inferior to a superior broad surface of a tactile stimulation device which defines a set of apertures for provision of mid-aid ultrasonic stimulation.

In additional or alternative variations, audio input devices can be arranged onboard supplementary devices (e.g., extended reality headset, mobile device, etc.), otherwise in an environment of the user, at a combination of devices and/or locations, and/or any other devices.

The audio input devices preferably include a set of microphones. The microphones can be any or all of: monodirectional, bidirectional, omnidirectional, microphones having any other directionalities, and/or any combination of microphones. Additionally or alternatively, the microphones can include any other microphones or combination of microphones, and/or any other audio input devices.

In one set of variants, the audio input devices include an analog microphone where an analog signal is produced at the microphone. In such a use case, passive circuit components (e.g., resistors, capacitors, inductors, etc.) can be configured as a filter (e.g., low-pass filter, notch filter, etc.) that gets applied to the incoming analog signal to significantly reduce or eliminate the ultrasonic part of the signal, thereby enabling the frequencies corresponding to ultrasound to be filtered out prior to digitizing. An ultrasound input barrier in the form of a physical barrier (e.g., plastic plate, fiber barrier, etc.) can additionally or alternatively be used to prevent saturation of the audio input device due to the ultrasound signal. An audio input barrier can additionally or alternatively be implemented.

In another set of variations, the audio input devices include a digital microphone with a set of physical ultrasound input barriers configured to block the ultrasound signal(s) and thereby prevent the ultrasound signal from being aliased into an audible signal which is transmitted to another user. Additionally or alternatively, filters and/or audio input barriers can be implemented.

The audio input devices further preferably include and/or interface with a set of ultrasound input barriers (e.g., as described above), which preferably function to block and/or filter audible effects from ultrasonic stimulation provided at the tactile stimulation device being picked up by the audio input devices (and/or further processed by the processing subsystem and/or provided as an output at a set of audio output devices). Additionally or alternatively, the audio input devices can function to mitigate and/or eliminate other audible effects (e.g., noise).

Alternatively, any or all of the microphones can be utilized in absence of one or more ultrasound input barriers and/or audio input barriers.

Additionally or alternatively, any other audio input devices can be used.

4.2 Method—Processing the Audio Information S200

The method 200 preferably includes processing the audio information S200, which functions to remove and/or minimize audible effects (e.g., unwanted audible effects) and/or a portion of the audio information collected in S100 from being conveyed to any or all users through a set of audio output devices. Additionally or alternatively, S200 can function to enhance audio information which is provided to any or all users, filter and/or edit audio information which is provided to any or all users, and/or can perform any other suitable functions.

S200 is preferably performed in response to S100, and further preferably in response to each instance of S100 (e.g., continuously throughout the interaction between users in an immersive environment). Additionally or alternatively, S200 can be performed in response to a portion of instances of S100 (e.g., at a predetermined frequency and/or set of intervals), in response to and/or during another process of the method 200, and/or at any other time(s).

S200 is preferably performed with a set of processing subsystems and a set of models and/or algorithms implemented at (e.g., executed at, run at/by, etc.) the set of processing subsystems. The processing subsystem is preferably at least partially arranged onboard the tactile stimulation device, but can additionally or alternatively be located at one or more supplementary devices (e.g., onboard an extended reality headset device, onboard a mobile user device, at a combination of devices, etc.), at a remote/cloud computing system, and/or at any combination of locations. The set of models and/or algorithms preferably functions to remove and/or mitigate a set of audible effects associated with inputs received at the audio input devices. The audible effects removed and/or mitigated in S200 preferably include audible switching effects (e.g., as described above) produced based on adjusting features (e.g., location, amplitude, phase, etc.) of the tactile stimulation (e.g., ultrasound waves). The audible effects removed and/or mitigated in S200 further preferably include audible feedback effects (e.g., as described above) resulting from having audio output devices in close proximity with a set of audio input devices, where the audio output continues to get louder as the input audio gets fed back into and amplified at the audio input devices. Additionally or alternatively, the audible effects can include noise (e.g., non-dialogue audio) collected in an environment of the user(s) (e.g., as shown in FIG. 4), such as, but not limited to: audio presented to the user as part of the immersive environment (e.g., music, other users' dialogue, sound effects from a game or other immersive experience, etc.), audio naturally occurring in the user's environment (e.g., doors closing, wind, street noise, etc.), and/or any other audio which is not desired to be conveyed to other users.

The set of models and/or algorithms preferably include trained models and/or algorithms, such as a set of machine learning algorithms (e.g., deep learning algorithms, neural networks, etc.) trained to process the signals received at any or all of the audio input devices to minimize and/or remove any or all unwanted audible effects.

In some variations, a single trained model and/or algorithm is utilized to mitigate and/or remove multiple audible effects.

In another set of variations, multiple trained models and/or algorithms are implemented (e.g., in series, in parallel, etc.).

Additionally or alternatively, S200 can include any other processing of the audio information collected in S100.

In a preferred set of variations, a first type of audible effect(s) (e.g., aliasing of ultrasonic stimulation) is mitigated and/or removed with the ultrasound input barriers in S100, and a second type of audible effect(s) (e.g., switching effects, feedback effects, noise, etc.) is mitigated and/or removed with a set of trained algorithms in S200.

4.3 Method—Transmitting the Processed Audio Information to any or all of the Set of Users S300

The method 200 can optionally include transmitting the processed audio information to any or all of the set of users S300, which functions to enable users to communicate with each other in an immersive environment. S300 further preferably enables users to communicate with each other while located remotely from each other (e.g., with minimal lag, etc.), but can additionally or alternatively enable users to interact in any other environments or configurations. Alternatively, the method 200 can be performed absent of S300.

S300 is preferably performed in response to S200, but can additionally or alternatively be performed multiple times (e.g., continuously, at a predetermined frequency or set of intervals, etc.) and/or at any other suitable time(s).

The processed audio information provided to each user preferably includes processed audio from all of the other users that are taking part in an immersive environment with the user (e.g., conversing with the user in a multi-user experience). These audio streams are preferably provided to the user based on the time stamps with which they were sampled (e.g., to preserve an intelligibility of the conversation), but can additionally or alternatively be selectively provided and/or otherwise provided. Additionally or alternatively, audio can be played back to a single user, recorded (e.g., and stored), not recorded, and/or otherwise utilized.

The audio information is preferably provided at a set of audio output devices, where the audio output devices preferably include speakers, but can additionally or alternatively include any other devices configured to produce audio output. In a preferred set of variations, the audio output devices are integrated in a supplementary device, such as onboard a headset device of an extended reality system (e.g., as shown in FIG. 4). Additionally or alternatively, audio output devices can be onboard the tactile stimulation device, integrated into a set of headphones, onboard a mobile device (e.g., mobile user device), in an environment of the user, and/or at any other locations or combination of locations.

The audio output devices preferably receive audio information from a remote computing system and/or server (e.g., private cloud) and optionally further through a set of applications executing on a supplementary device (e.g., headset device, user device, etc.). In a set of variations (e.g., as shown in FIG. 4), for instance, processed audio from users in a set of users is received via applications executing on an associated device (e.g., headset device, user device, etc.) at a remote computing system, where it is then sent to an application associated with the recipient user and played at audio output devices in communication with that application (e.g., onboard a supplementary device hosting the application). Additionally or alternatively, audio output to users can be provided at a set of speakers onboard the tactile stimulation devices, at a mobile user device, in absence of a remote computing system and/or server, in absence of a set of applications, and/or with any other devices.

Additionally or alternatively, the method 200 can include any other suitable processes, such as, but not limited to: updating (e.g., retraining, continuously retraining, updating based on maximizing a reward function, updating based on audio quality metrics associated with audio transmitted to a second user, etc.) any or all of the models and/or algorithms; repeating (e.g., continuously, at a predetermined frequency, etc.) any or all of the method processes; and/or any other processes.

5. Variants

In a first set of variants, the system includes and/or the method utilizes a set of analog microphones and a circuitry filter comprising circuitry components (e.g., notch filter, low-pass filter, filter with capacitors and/or resistors and/or inductors), which functions to filter out the ultrasonic frequency signal (e.g., 40 kHz signal) before the received signal is processed with a digital sampling process, thereby preventing audible aliased artifacts from being created. The system can optionally further include an ultrasonic input barrier in the form of a physical barrier (e.g., plate, fibrous material, etc.), which can function to further filter out the ultrasonic frequency signal and/or prevent the microphones from being saturated by this part of the signal, which could effectively block the desired audio information from being received.

In a second set of variants, the system includes and/or the method utilizes a digital microphone and a physical ultrasonic input barrier (e.g., plate, fibrous material, etc.), which functions to physically block the ultrasonic pressure waves that are provided to the user's environment from being picked back up by the microphone (e.g., and creating an aliased audible artifact that is transmitted to a second user, and creating an aliased audible artifact that is transmitted to a second user and not heard by the first user, etc.). In examples, the digital microphone has a sampling frequency that is less than twice the value of the frequency of the ultrasound pressure waves, which is what enables the production of the aliased audible signal. Alternatively, the digital microphone can have a sampling frequency of any value.

In a third set of variants, the system includes and/or the method utilizes a digital microphone having a sampling frequency of at least twice the value of the ultrasonic frequency (e.g., sampling frequency of 80 kHz or higher, sampling frequency of 40 kHz or higher, etc.), which prevents the creation of the aliased audible artifact.

Additionally or alternatively, the system and/or method can be otherwise suitably configured.

Although omitted for conciseness, the preferred embodiments include every combination and permutation of the various system components and the various method processes, wherein the method processes can be performed in any suitable order, sequentially or concurrently.

Embodiments of the system and/or method can include every combination and permutation of the various system components and the various method processes, wherein one or more instances of the method and/or processes described herein can be performed asynchronously (e.g., sequentially), contemporaneously (e.g., concurrently, in parallel, etc.), or in any other suitable order by and/or using one or more instances of the systems, elements, and/or entities described herein. Components and/or processes of the following system and/or method can be used with, in addition to, in lieu of, or otherwise integrated with all or a portion of the systems and/or methods disclosed in the applications mentioned above, each of which are incorporated in their entirety by this reference.

Additional or alternative embodiments implement the above methods and/or processing modules in non-transitory computer-readable media, storing computer-readable instructions. The instructions can be executed by computer-executable components integrated with the computer-readable medium and/or processing system. The computer-readable medium may include any suitable computer readable media such as RAMs, ROMs, flash memory, EEPROMs, optical devices (CD or DVD), hard drives, floppy drives, non-transitory computer readable media, or any suitable device. The computer-executable component can include a computing system and/or processing system (e.g., including one or more collocated or distributed, remote or local processors) connected to the non-transitory computer-readable medium, such as CPUs, GPUs, TPUS, microprocessors, or ASICs, but the instructions can alternatively or additionally be executed by any suitable dedicated hardware device.

As a person skilled in the art will recognize from the previous detailed description and from the figures and claims, modifications and changes can be made to the preferred embodiments of the invention without departing from the scope of this invention defined in the following claims.

We claim:

1. A system for providing mid-air tactile sensation to a user, the system comprising:
   a tactile stimulation device, comprising:
      a set of transducers configured to produce a set of tactile outputs;
      a surface defining a set of apertures, the set of apertures configured to enable transmission of the set of tactile outputs to a location of the mid-air tactile sensation, wherein the location of the mid-air tactile sensation is outside of the tactile stimulation device; and
      an audio input barrier subsystem configured to block detection of information corresponding to the set of tactile outputs in a signal received at a set of audio sensors.

2. The system of claim 1, wherein the set of tactile outputs comprises a set of tactile pressure waves.

3. The system of claim 2, wherein the set of tactile pressure waves are ultrasonic pressure waves.

4. The system of claim 1, wherein the set of audio sensors is arranged onboard the tactile stimulation device.

5. The system of claim 4, wherein the set of audio sensors comprises a set of microphones and wherein the signal comprises audio from the user.

6. The system of claim 1, wherein the audio input barrier subsystem comprises a set of physical audio input barriers that at least partially cover a second set of apertures, the second set of apertures arranged proximal to the set of audio sensors.

7. The system of claim 6, wherein the set of physical audio input barriers comprises at least one of a plastic material or a fibrous adhesive material.

8. The system of claim 1, wherein the audio input barrier subsystem blocks the detection of information based at least in part on a frequency of the signal received at the set of audio sensors.

9. The system of claim 1, wherein the audio input barrier subsystem comprises a set of trained models evaluated at a processing subsystem in communication with the tactile stimulation device.

10. The system of claim 1, further comprising transmitting the signal to a second tactile stimulation device associated with a second user, the second tactile stimulation device separate, distinct, and remotely arranged from the first tactile stimulation device.

11. A method for providing mid-air tactile sensation to a user, the method comprising:
   activating a set of transducers of a tactile stimulation device to produce a set of tactile outputs, thereby forming the mid-air tactile sensation outside of the tactile stimulation device;
   collecting an audio signal from an environment of the user with a set of audio sensors, wherein collecting the audio signal comprises blocking a detection of audio information corresponding to the set of tactile outputs.

12. The method of claim 11, wherein the audio information corresponding to the set of tactile outputs comprises an audible artifact produced by producing the set of tactile outputs.

13. The method of claim 11, further comprising transmitting the audio signal to a second tactile stimulation device associated with a second user, the second tactile stimulation device separate, distinct, and remotely arranged from the first tactile stimulation device.

14. The method of claim 13, further comprising evaluating the audio signal with a set of trained models prior to transmission.

15. The method of claim 11, wherein the set of tactile outputs comprises a set of tactile pressure waves.

16. The method of claim 15, wherein the set of tactile pressure waves are ultrasonic pressure waves.

17. The method of claim 11, wherein the tactile stimulation device comprises an audio input barrier subsystem configured to block the detection of the audio information.

18. The method of claim 17, wherein the audio input barrier subsystem blocks the detection of information based at least in part on a frequency of the signal received at the set of audio sensors.

* * * * *